Aug. 6, 1968
E. J. COWAN
3,395,693
HIGH EFFICIENCY SPACE HEATER
Filed March 15, 1967
2 Sheets-Sheet 1
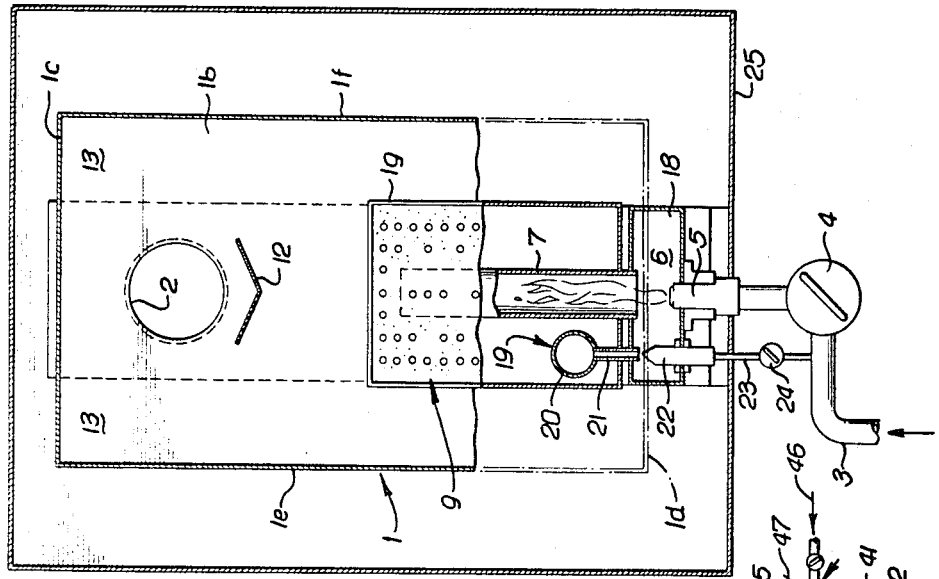
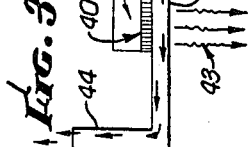
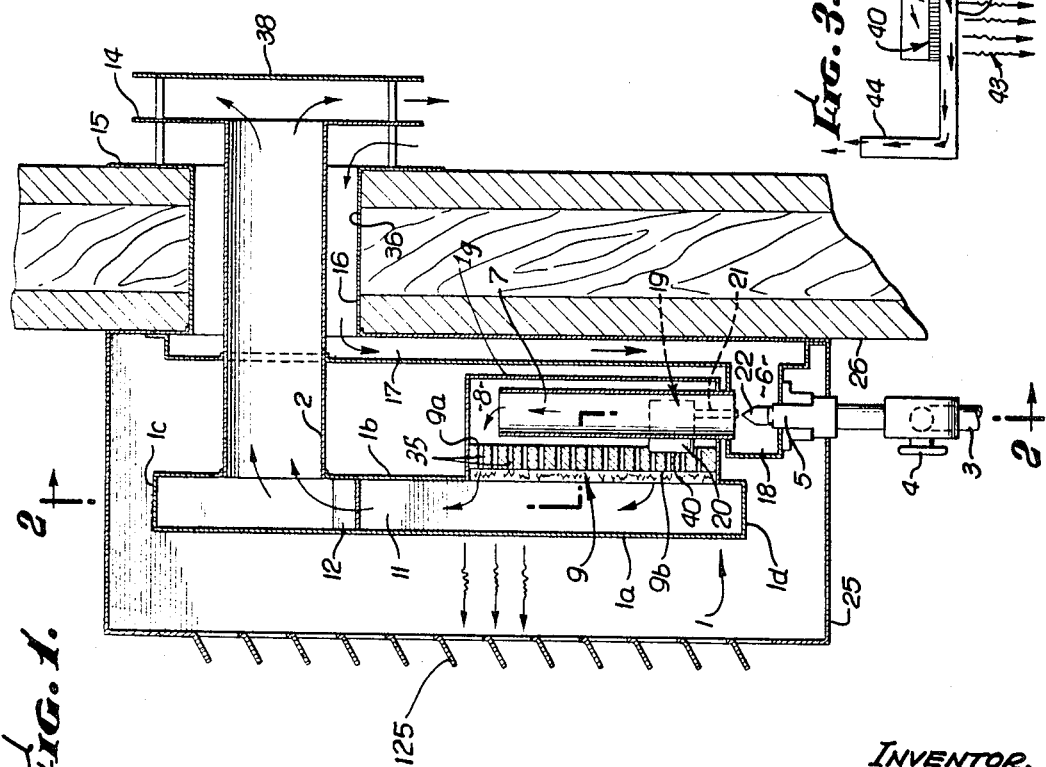
INVENTOR.
EDWIN J. COWAN
BY White & Haefliger
ATTORNEYS.

INVENTOR.
EDWIN J. COWAN
By White & Haefliger
ATTORNEYS.

United States Patent Office 3,395,693
Patented Aug. 6, 1968

3,395,693
HIGH EFFICIENCY SPACE HEATER
Edwin J. Cowan, 275 Manzanita,
Sierra Madre, Calif. 91024
Filed Mar. 15, 1967, Ser. No. 623,256
11 Claims. (Cl. 126—92)

ABSTRACT OF THE DISCLOSURE

The disclosed heater employs a radiant burner structure to which gas and air are supplied effecting combustion closely adjacent the outlet side of a perforated ceramic grid. Combustion chamber structure at the outlet side of the grid forms an enclosed combustion zone, the chamber including a metal panel closely spaced from the grid and from which is derived infrared radiation of equal or higher intensity than that produced by the burner structure in the absence of the combustion chamber panel.

Background of the invention

This invention relates generally to heaters embodying radiant burners and more specifically concerns the use of radiant burner heater structure for highly efficient infrared heating. Apparatus embodying the invention is particularly suited to sealed-combustion heaters of the type that require complete closure of the combustion chamber so that air is not removed via the heater from the space being heated, and so that combusted gases cannot escape into the room being heated.

In the past, ceramic plate type infrared burners have been used for space heating and in process heating environments. Such burners have been considered advantageous since the perforated surface of the ceramic achieves a high temperature and therefor emits infrared radiant energy at a high intensity level; however, they also suffer certain disadvantages which include open exposure of the flame sides of the burners to wind and water which can disrupt burner operation. Also, open exposure of the burners for space heating can be dangerous to safety by reason of combustion gas admission to rooms being heated. While it is possible to vent such burners with air dilution of combustion gases and in so doing transmit heat from a plate placed directly in front of the burner, it has been felt disadvantageous to do so due to reduction in transmitted radiation intensity, with concomitant less than satisfactory commercial practicality. Still others have attempted to produce radiation through glass-like substances such as quartz, glass and Vycor (a synthetic glass having high infrared transmission capacity); however, such expedients result in substantial losses in energy transmission, and in addition glass plates are subject to breakage and would not be considered dependably safe for confining dangerous combustion gases particularly in household heating appliances.

Summary of the invention

It is a major object of the invention to provide heating apparatus overcoming the above mentioned disadvantages. Basically, the heater comprises an integral ceramic grid having an inlet side to which combustible gas and air are supplied, an outlet side opposite the inlet side and a large number of relatively small cross sectional openings directed in generally parallel relation to pass the gas and air between the grid opposite sides for combustion closely adjacent the outlet side; supply means to supply gas and air to the inlet side of the grid; and combustion chamber structure at the outlet side of the grid and forming an enclosed combustion zone having particularly advantageous relation to the grid. For example, the chamber structure includes a heat radiating metal panel extending generally parallel to the outlet side of the grid and spaced sufficiently close to it that when the panel is heated to glowing red condition the temperature at the grid outlet side is substantially enhanced over that level which would prevail in the absence of the combustion chamber structure. Also, the intensity of infrared radiation from the panel at the side opposite the grid and at selected distance from the grid is at least about the same as or in excess of the radiation intensity which would exist at that distance in the absence of the combustion chamber structure, the structure blocking inflow of combustion air other than through the grid and forming an outlet to pass combusted gases from the combustion zone and for drawing those gases generally parallel to and adjacent the panel and in a flow direction toward the outlet.

Typically, the panel spacing from the grid is made less than about one inch; the grid temperature is enhanced to a level between about 1,600° F. and 2,000° F.; and the cross sectional area of the openings at the grid outlet side is greater in sum than 20% of the overall surface area of the grid outlet side over which the openings are distributed with a density in excess of 100 openings per square inch, to cause combustion of gas and air within ¼ inch of the grid outlet side. As a result, not only can the radiant output from the plate be made to exceed the output from the burner alone, but also, the overall radiant efficiency of the system in terms of radiant output versus B.t.u. gas input can be made to exceed 50%. These results make the device highly practical from a commercial standpoint, in terms of heating efficiency and safety.

Further, in a specific embodiment the combustion chamber is sealed so as to confine all the gases discharged from the grid to flow generally upward to the flue structure, and also to exclude secondary air supply to the combustion zone. Accordingly, there is no opportunity for the products of combustion to recirculate causing operating difficulties. Also, because all of the air supply is introduced as primary air through a venturi or air-gas injection tube, which is quite small in size in relation to normal secondary air openings, the volume of dilution air that can be forced through the apparatus under wind conditions is materially reduced or limited. In addition, use of a heating panel at the combustion chamber, as will be described, effects natural gravity drawing of a higher percentage of primary air to the grid, so that more gas can be burned for a given size grid, to create more heat.

Other objects and advantages of the invention include the provision of a casing receiving the combustion chamber; the provision of an air inlet duct which has a raised horizontal section for extension through a structural wall, the inlet duct having a downcomer section through which cool air is siphoned downwardly to flow toward the inlet side of the grid; and the provision of flue and air inlet duct terminals that are adjacent and adapted to extend outside the structural wall, together with baffling at such terminals to obstruct direct wind pressure access to the interior of the duct and flue.

Brief description of the drawings

These and other objects and advantages of the invention, as well as the details of illustrative embodiments, will be more fully understood from the following detailed description of the drawings, in which:

FIG. 1 is a sectional side view of one preferred form of the heating unit incorporating the invention;
FIG. 2 is a section taken on line 2—2 of FIG. 1;
FIG. 3 shows a slightly different form of heating unit.

Description of the preferred embodiments

Figure 4:
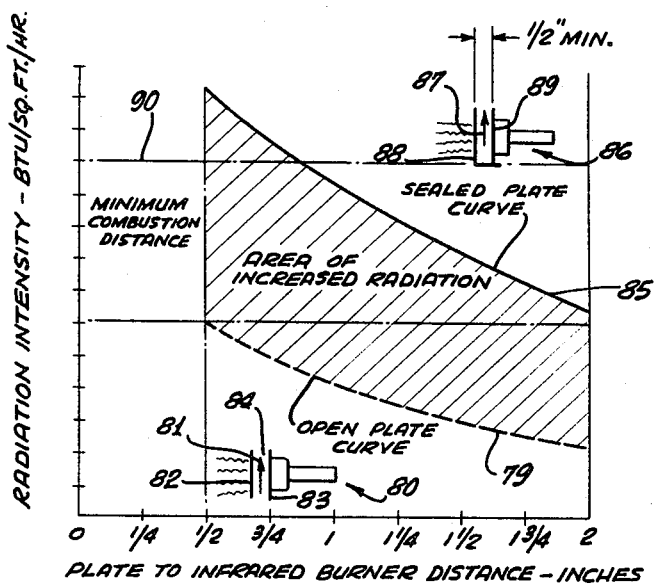
FIG. 4 is a graph illustrating radiation intensities at various plate to burner spacings.

As seen in FIGS. 1 and 2, the combustion chamber or heating element 1 has front and rear walls 1a and 1b that are relatively closely spaced, and top and bottom as well as side walls 1c to 1f. At the entrance to the chamber 1 is a grid 9 which may be vertically elongated as shown. The grid has an inlet side 9a to which combustible gas and air are supplied, an outlet side 9b facing the interior of the chamber 1, and porosity to pass the gas and air for complete combustion closely adjacent the outlet side 9b. Typically, the grid may consist of ceramic material having up to 200 small holes 35 per square inch of surface area, and because of the construction of the apparatus combustion occurs within ¼ inch (and typically within ⅛ inch) of the outlet surface 9b. Also, because the grid is enclosed by chamber 1, as for example by the protruding portion 1a thereof, the face 9b of the grid typically becomes elevated in temperature well in excess of about 1600° F., and the front face of the front wall 1a of chamber 1 directly opposite the grid is typically heated to a glowing red condition.

The combustion gas then passes up through the interior 11 of the combustion chamber, and past a gas baffle 12 which may be inserted to cause the hot gases to swirl out to the corners 13 of the chamber 1 before passing out through the flue 2. This action produces efficient wiping of the interior surface of the walls of heating element or chamber 1 for maximum efficiency of heat transfer. The gases pass through the horizontal flue section illustrated as extending outwardly within an air inlet duct section 16, and within an opening 36 in a structural wall 26. A discharge plate or baffle functions to prevent wind pressure from striking directly into the flue outlet, the plate being shown at 38.

Air is supplied to the inlet side of the ceramic grid 9 via the inlet ducting 16 having an outer terminal defined by wall plate 15 and baffle 14, these elements also preventing direct access of exterior wind pressure to air inlet. The air is drawn downwardly in downcomer 17 section of the ducting and into an air cup 18 wherein is located an orificed terminal or spud 5 supplying combustible gas. The air supply is injected by the vertically rising gas stream from the spud into venturi tube 7. Cock 4 in pipe 3 controls the gas supply.

The device functions by gravity through a siphoning process. The combustion gases in the combustion chamber 11 are hot and therefore, much less dense than the inlet air in the air passage 6. Therefore, the device is capable of siphoning inlet air into the heater from near the top of the appliance and discharging its combustion gases through the same level, approximately. The siphoning of the combustion gases out of the appliance and the inlet air into the appliance is aided by the injection of air accomplished by the venturi action of the venturi 7, and the energy of the gas supply issuing out from the orifice spud 5. At no time in the operation of the device, except momentarily when it is initially fired, should the pressure within the combustion chamber 11 exceed the pressure in the burner head 8. In actual operation, the gravitational pull of the heated gases in the combustion chamber 11 maintains a suction on the face 9b of the grid.

The pilot 19 is actually a miniature burner unit utilizing a circular portion 40 of the face of the grid itself as a combustion surface for the pilot. The pilot burner head 20 encloses the gas-air mixture of the pilot and has its own pilot venturi 21 to supply the gas-air mixture to the pilot burner head 20. A pilot gas orifice 22 supplies gas to the pilot which also injects its primary air from the air passageway 6. A separate gas supply line 23 supplies gas to the pilot gas spud 22, and a pilot shut-off valve 24 controls the gas supply to the pilot from the gas manifold, or inlet gas piping 3. Therefore, the pilot operates in the same manner as the main burner of the unit, that is, the pilot operates only on primary air and has no secondary air supply. Inasmuch as the pilot burning surface is the same surface as the face 9b of the grid 9, ignition of the main burner from the pilot burner is immediate because in fact, they are one and the same surface and the pilot burning surface is simply a circular portion of the main grid face 9b surface of the burner. Ignition of the main burner from the pilot has been found to be both silent and immediate in its operation.

The heater itself may be enclosed in a casing 25 as a protective device to prevent physical contact with the hot surfaces of the element or combustion chamber itself. Radiant heat is given off from the front surface 1a of the heating element, particularly directly opposite the 1600° F. to 2000° F. grid surface. Circulating warmth is obtained from the room air supply passing upward on the outside of the heating element surface itself, as within and upwardly through the casing via front louvers 125.

The illustration shown in the drawing indicates the heater mounted on a wall section 26. The inlet air and gas discharge cap on the exterior of the building is so designed that wind pressure striking the side of the building will exert greater pressure on the inlet air passageway than on the flue gas outlet passageway, therefore allowing the gas mixture to be siphoned out of the appliance under wind conditions.

The heating device seen in FIG. 3 is oriented to produce heat radiation in a vertical direction, as for example downwardly. Thus, the grid 40 extends horizontally, although it otherwise may conform structurally to grid 9 in FIG. 1. Also, the heat radiating element or chamber 41 extends beneath grid 40, and includes a front wall 42 that glows in operation to radiate heat as seen at 43. Gases are drawn from the chamber 41 as by flue 44. The burner head exterior is indicated at 45, and combustible gas and air are supplied thereto as indicated at 46 and 47 respectively.

An important feature of my device is the manner in which the hot gases may be enclosed within a heat exchanger attached to the burner, so that a highly efficient rate of heat transfer can be produced through the opposing surface of the heat exchanger. In doing this, the gas burning surface cannot be disturbed by wind conditions and further, allows one to produce a safety sealed system wherein the combustion gases may be confined within a steel chamber, and therefore can be channeled for safe removal out of the room area in which the heating device is located.

The device operates best when a negative pressure is maintained on the gas burning surface of the grid at all times during the combustion process. In this instance, negative pressure is referred to as a pressure that is less than the pressure at the primary air openings of the burner. Normally speaking, both the primary air openings and the outlet of the heating element are in the same pressure zone. Further, the device has been designed to operate without need of a power blower. The basic gas burner utilizes the draw of the heating element which is filled with hot gases to produce a negative pressure on the gas burning port surface itself. Because of the draw of the heating element, a negative pressure may be maintained on the gas burning port surface if little or no secondary air supply is allowed in the heating element. In fact, a secondary air supply is not desired, as such an additional supply of air would kill the negative pressure on the gas burning surface itself.

The present device causes a greater supply of primary air to be drawn through the gas burner ports than can be normally drawn by a conventional infra-red burner that is exposed to atmospheric pressure. Therefore, the draw or negative pressure produced on the infra-red burning surface causes the injection of a greater amount of primary air supply than would normally occur. The increased volume of air being drawn through the burner head produces an even sharper and smaller flame than would occur without the negative pressure on the gas ports. This, in turn, causes the ports to become more efficiently heated because of greater conduction between the shorter burning gas flame and the burner ports themselves. Thus, by drawing the burner gases off the burner ports by natural siphoning, a higher efficiency of burning gas is produced than would otherwise occur. It should be added that the gases being confined within a heating element may be washed of the residual heat in the gases themselves to produce even greater efficiency of the burning apparatus. However, it should be noted that this can only be accomplished by reducing or eliminating a passageway for secondary air supply to such a degree that a negative pressure exists on the gas burning port surface itself.

In further considering the operation of the above heaters, reference is made to FIG. 4 showing a graph of radiation intensity at a selected distance from the grid versus distance of the panel from the grid. Lower curve 79 refers to a construction as seen in the insert 80 where the combustion zone 81 between the panel 82 and grid 83 is vented, i.e. dilution air enters zone 81 to mix with the products of combustion and exit at discharge opening 84.

Higher curve 85 refers to a construction as seen in the insert 86 (and also in FIGS. 1-3) wherein dilution air cannot enter the combustion zone 87 between the panel 88 and grid 89 the zone 87 being enclosed on all sides except for the outlet. Note that as the panels 82 and 88 are closed toward the respective grids the intensity of radiation at a given distance from the panel increases; however, in the case of curve 79 the intensity never comes close to the intensity level 90 representing that for an openly exposed burner (i.e., no combustion chamber or panel structure) as measured at the same distance from the grid. On the other hand, it has been found that for the enclosed construction, represented by insert 86, the intensity can be made to be about the same as or even to exceed that represented by level 90. Thus, for the example shown, when the plate distance from the grid is less than about one inch, the intensity of radiation achieved from the plate is about that achieved from the open burner, and when the distance is less than 5/8 inch, the intensity from the plate is greater than that from the open burner. This is believed due to feedback radiation from the plate acting to heat the ceramic to a temperature substantially above what it would be were there no plate used.

In a typical example, a rectangular burner four inches wide and five inches long and having 4,000 gas and air openings was supplied with 8,000 B.t.u. per hour of natural gas at 7.5 inches of water pressure, the construction being similar to that of FIG. 1. Enclosing combustion chamber structure included an oxidized stainless steel front plate of 20 gauge thickness. Using this apparatus, the data of FIG. 4 was obtained, and the temperature of the ceramic grid could be raised to between 1,800° and 2,000° F., for plate spacings less than about one inch from the grid, whereas in the absence of the plate the ceramic grid surface temperature was 1,600° F. In this regard, radiation intensity from a body at 1,800° F. is about 160% that from a body at 1,600° F. The plate temperature could in this manner be raised to in excess of 1,100° F. and as high as 1,300° F. Such a grid has cylindrical openings whose cross sectional areas in sum, and at their outlets, is greater than 20% of the overall surface area of the outlet side, over which such openings are uniformly distributed with a density well in excess of 100 openings per square inch, the gas and air then combusting within 1/4 inch of the outlet side of the grid. Also, since the metal plate has no openings, all of its surface is used for heat radiation, as contrasted to the grid which has 20% to 50% burner port area which is not usable for heat radiation. Accordingly, the plate can be brought very close to the ceramic grid, i.e., within 1/2 inch of the grid, without interference with combustion.

Figure 5:
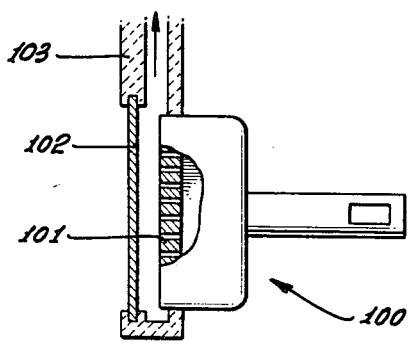
FIG. 5 illustrates a modified heating unit.
Figure 6:
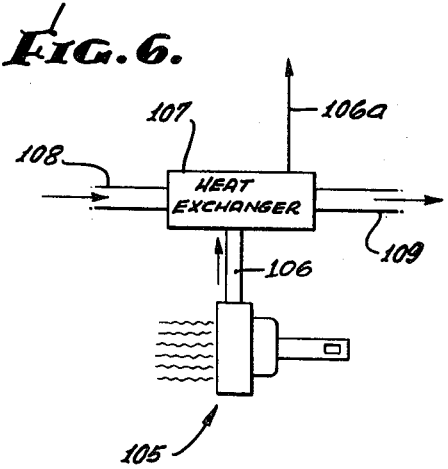
FIG. 6 illustrates combination of the heater unit with an auxiliary heat exchanger.

FIG. 5 shows a heater unit 100 having a grid 101 like that at 9 in FIG. 1, and the combustion chamber structure includes a metal plate 102 closely spaced to the grid. The chamber includes insulated paneling 103 mounting the rectangular metal plate to minimize heat loss by conduction from the plate to the peripheral chamber structure. Also, the panel remains at more uniform temperature throughout its area. FIG. 6 shows a heater unit 105 having a ceramic grid and metal plate as described above. Hot combustion gases discharging at 106 are passed through a heat exchanger 107 for heating another fluid passed through the exchanger via entrance duct 108 and exit duct 109. Such combustion gases contain salvageable heat at a much higher temperature than would exist were they diluted with air at the combustion zone of the unit 105, whereby the efficiency of heat transfer at unit 107 is substantially enhanced.

This application is a continuation-in-part of my copending application Ser. No. 524,254, entitled "High Efficiency Space Heater," filed Feb. 1, 1966.

I claim:
1. In a space heater,
an integral ceramic grid having an inlet side to which combustible gas and air are supplied, an outlet side opposite said inlet side and a large number of relatively small cross section, and generally parallel through openings directed to pass the gas and air between said sides for combustion closely adjacent said outlet side,
combustion chamber structure at the outlet side of the grid and forming therewith an enclosed combustion zone, said structure including a heat radiating metal panel extending generally parallel to said outlet side of the grid and spaced less than about one inch from the grid so that in response to said combustion the panel is heated to glowing red condition and the temperature at the grid outlet side is substantially enhanced over that level which would prevail in the absence of said combustion chamber structure, and the intensity of infrared radiation from the panel at the side thereof opposite the grid and at a selected distance from the grid outwardly of the panel is in excess of the radiation intensity which would exist at that distance in the absence of said combustion chamber structure, said structure blocking inflow of combustion air other than through the grid and forming an outlet to pass combusted gases from said zone and for drawing said gases parallel to and adjacent said panel and in a flow direction toward said outlet, and
means for supplying gas and air to said inlet side of the grid and at a rate sufficient for said combustion and for heating the panel to said glowing red condition and to an outer surface temperature opposite the grid in excess of about 1,100° F.

2. The heater of claim 1, wherein said panel spacing from the grid is less than about 5/8 inch and the temperature of the grid surface facing said panel is in excess of about 1,600° F.

3. The heater of claim 1, wherein the cross sectional area of said openings at said outlet side is greater in sum than 20% of the overall surface area of said outlet side over which said openings are distributed to cause combustion of gas and air within 1/4 inch of the outlet side of the grid.

4. The heater of claim 1 including a casing receiving said combustion chamber structure and spaced therefrom.

5. The heater of claim 1, wherein said combustion chamber is sealed so that air flows thereto only via the inlet side of the grid.

6. The heater of claim 1, in which said last named means includes an inlet air duct, said outlet defined by a flue, said duct and said flue having raised horizontal sections for extension through a structural wall, the inlet air duct having a downcomer section through which relatively cooler inlet air is siphoned downwardly to flow toward said inlet side of the grid.

7. The heater of claim 1, in which said supply means includes gas piping having an orificed terminal, a tube spaced from said terminal and having an entrance into which gas and air are injected, the tube having an outlet through which gas and air in the tube are supplied to the inlet side of the grid.

8. The heater of claim 6, in which flue and inlet air duct have adjacent terminals adapted to extend exteriorly of said structural wall, and including baffling at said terminals to obstruct direct wind pressure access to the interiors of said duct and flue.

9. The heater of claim 7, including means to supply pilot gas and air to said heater, said means including a burner head having an outlet located to discharge pilot gas and air to flow through said grid openings, said housing structure also passing air to flow to the burner head.

10. The heater of claim 1, in which said chamber structure includes a heat insulator bounding the periphery of said panel.

11. The heater of claim 1, including other heat exchanger means connected to receive hot combustion gases from said outlet.

References Cited

UNITED STATES PATENTS

| | | | |
|---|---|---|---|
| 2,806,465 | 9/1957 | Hess | 126—92 |
| 2,921,176 | 1/1960 | Scofield | 126—92 |
| 3,211,079 | 10/1965 | Carlson | 126—85 |
| 3,241,542 | 3/1966 | Lotter | 126—39 |

FREDERICK L. MATTESON, JR., *Primary Examiner.*

E. G. FAVORS, *Assistant Examiner.*